United States Patent [19]

Campbell et al.

[11] Patent Number: 4,840,982

[45] Date of Patent: Jun. 20, 1989

[54] POLYMER BLENDS CONTAINING IONOMERIC ELASTOMERS

[75] Inventors: John R. Campbell, Clifton Park; Robert E. Williams, Jr., Scotia; Sterling B. Brown, Schenectady, all of N.Y.; Paul M. Conroy; Robert A. Florence, both of Pittsfield, Mass.

[73] Assignee: General Electric Company, Schenectady, N.Y.

[21] Appl. No.: 82,907

[22] Filed: Aug. 10, 1987

Related U.S. Application Data

[63] Continuation of Ser. No. 791,881, Oct. 28, 1985, abandoned, which is a continuation-in-part of Ser. No. 619,433, Jun. 11, 1984, abandoned, which is a continuation-in-part of Ser. No. 528,188, Aug. 31, 1983, abandoned, which is a continuation-in-part of Ser. No. 528,189, Aug. 31, 1983, abandoned.

[51] Int. Cl.$^4$ .............................................. C08K 5/51
[52] U.S. Cl. ................................. 524/151; 524/394; 525/68; 525/92; 525/905
[58] Field of Search .............. 524/151, 394; 525/68, 525/92, 905

[56] References Cited

U.S. PATENT DOCUMENTS

| | | |
|---|---|---|
| 3,642,728 | 2/1972 | Canter . |
| 3,847,854 | 11/1974 | Canter . |
| 3,870,841 | 3/1975 | Makowski et al. . |
| 3,887,646 | 6/1975 | Yonemitsu et al. . |
| 3,960,985 | 6/1976 | Cooper . |
| 4,128,602 | 12/1978 | Katchman et al. ............... 525/905 |
| 4,191,685 | 3/1980 | Haaf et al. ........................ 524/141 |
| 4,238,376 | 12/1980 | Wilson . |
| 4,480,057 | 10/1984 | Sano ................................... 525/92 |

OTHER PUBLICATIONS

Graiver et al., *J. Polymer Sci., Polymer Chem. Ed., Ed.,* 17, 3559–3572 (1979).

*Primary Examiner*—Melvyn I. Marquis
*Attorney, Agent, or Firm*—William H. Pittman; James C. Davis, Jr.

[57] ABSTRACT

Polymer blends having improved impact resistance and structural integrity comprise at least one aromatic polymer such as polyphenylene oxide, optionally in combination with a styrene homopolymer; at least one elastomer containing highly polar ionic (e.g., sulfonate or carboxylate) substituents, such as a sulfonated EPDM rubber or a zwitterionic polysiloxane sulfonate; and at least one substituted aromatic polymer in which the substituents are highly polar ionic substituents, such as a sulfonated polyphenylene oxide or styrene-sodium acrylate copolymer. The compositions preferably also contain at least one plasticizer.

20 Claims, No Drawings

POLYMER BLENDS CONTAINING IONOMERIC ELASTOMERS

This application is a continuation of application Ser. No. 791,881, filed Oct. 28, 1985, now abandoned, which is a continuation-in-part of application Ser. No. 619,433, filed June 11, 1984, which in turn is a continuation-in-part of applications Ser. Nos. 528,188 and 528,189, both filed Aug. 31, 1983, all now abandoned.

INTRODUCTION AND SUMMARY OF THE INVENTION

This invention relates to aromatic resinous compositions having improved impact properties.

Aromatic polymers such as polycarbonates and polyphenylene ethers have found wide use as engineering resins. Their durability and strength have made them suitable for use in areas previously reserved for metals. The necessity for high performance in these areas requires continuing development in the direction of improving properties such as impact resistance and structural integrity.

An example of a resin system in which development is continuing is the polyphenylene ether system. Polyphenylene ethers are normally combined with vinyl aromatic polymers such as polystyrenes for use as engineering resins. The impact resistance and ease of processing of polyphenylene ether-polystyrene and similar systems has frequently been improved by the incorporation therein of a minor proportion of elastomeric groups such as those provided by an EPDM rubber, in combination with one or more plasticizers. It is sometimes found, however, that resinous compositions of this type undergo environmental stress-cracking during and after molding. They may also undergo delamination because of the limited compatibility of the constituents.

Polycarbonates are further examples of resin systems which are developing in this area. In general, polycarbonates derived from bisphenol A have relatively good impact properties. However, there is some tendency toward decreased impact strength with increased thickness of the parts molded therefrom. Also, it would be useful to improve the low-temperature ductility of said parts. On the other hand, polycarbonates derived from such compounds as 2,2',-6,6'-tetramethylbisphenol A are frequently deficient in impact properties and considerable improvement thereof is desired.

A principal object of the present invention, therefore, is to provide a new class of polymer blends.

A further object is to improve various properties of aromatic polymers, including impact resistance and tensile strength, without introducing other problems such as environmental stress-cracking and delamination.

A still further object is to provide novel polymer blends suitable for use as engineering resins, said blends having a high degree of compatibility and other desirable properties caused by high particle adhesion as a result of a novel mechanism of bonding.

Other objects will in part be obvious and will in part appear hereinafter.

In its broadest aspect, the present invention is directed to polymer compositions comprising:

(A) a major proportion of at least one substantially non-ionic aromatic polymer;

(B) a minor proportion, effective to increase impact resistance, of at least one elastomer containing highly polar ionic substituents; and (C) a minor proportion, effective to maintain component B as a substantially stable disperse phase in component A, of at least one substituted aromatic polymer, the substituents thereon being highly polar ionic substituents.

COMPONENT A

Component A, the principal polymeric component of the compositions of this invention, is at least one substantially non-ionic aromatic polymer. It may be an addition polymer, a condensation polymer, or a mixture thereof. Preferably, it comprises a major amount of condensation polymers, and it frequently consists entirely of condensation polymers.

As used herein, the term "substantially aromatic" denotes a polymer in which a substantial proportion of the mers (i.e., repeating monomer-derived units) contain an aromatic moiety, such as a benzene or naphthalene group. In general, at least about 40% by number of the mers, preferably at least about 90% and frequently 100%, contain an aromatic moiety. The term "substantially non-ionic" denotes polymers substantially free from highly ionic groups such as sulfonic acid, carboxylic acid, phosphorus acid or quaternary ammonium groups. The polymer may, however, contain moderately polar substituents such as halo, nitro, cyano, amino or the like.

Illustrative addition polymers useful as component A include homopolymers and copolymers of such ethylenically unsaturated aromatic compounds as styrene, chlorostyrenes, bromostyrenes, fluorostyrenes, methylstyrenes, ethylstyrenes, cyanostyrenes, vinylnaphthalene, divinylbenzene and allylbenzene. Most often, the addition polymer is a styrene homopolymer.

A wide variety of condensation polymers may be used as component A. They include phenol-aldehyde resins, epoxy resins, polyesters, polycarbonates, polyphenylene ethers, polyamides and polyimides. The preparation and structures of these polymers are well known in the art, and further discussion herein will be limited to the preferred subgenera; i.e., polyphenylene ethers, aromatic polycarbonates, aromatic polyimides, and aromatic polyesters substantially free from ethylenic unsaturation.

The polyphenylene ethers (also known as polyphenylene oxides) are a preferred subgenus of polymers useful as component A, since the present invention has been found extremely useful for preparing polyphenylene ether compositions with improved impact resistance and structural integrity. Polyphenylene ethers are a well known class of polymers widely used in industry as a result of the discovery by Allan S. Hay of an efficient and economical method of preparation. Since their discovery, they have given rise to numerous variatons and modifications but still may, as a class, be generally characterized by the presence of arylenoxy structural units. The present invention includes all of said variations and modifications, including but not limited to those described hereinafter.

The polyphenylene ethers generally comprise structural units having the formula

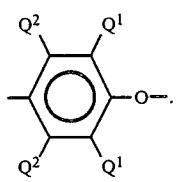

(I)

In each of said units independently, each $Q^1$ is independently hydrogen, halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Suitable polyphenylene ethers are disclosed in a large number of patents. The following are illustrative but not limiting:

| | | | |
|---|---|---|---|
| 3,226,361 | 3,330,806 | 3,929,930 | 4,234,706 |
| 3,234,183 | 3,390,125 | 4,028,341 | 4,334,050 |
| 3,257,357 | 3,431,238 | 4,054,533 | 4,340,696 |
| 3,257,358 | 3,432,466 | 4,092,294 | 4,345,050 |
| 3,262,892 | 3,546,174 | 4,097,556 | 4,345,051 |
| 3,262,911 | 3,700,630 | 4,140,675 | 4,374,959 |
| 3,268,478 | 3,703,564 | 4,158,728 | 4,377,662 |
| 3,306,874 | 3,733,307 | 4,207,406 | 4,477,649 |
| 3,306,875 | 3,875,256 | 4,221,881 | 4,477,651 |
| 3,318,959 | 3,914,266 | 4,226,951 | 4,482,697 |
| | | | 4,517,341. |

Both homopolymers and copolymers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in various Hay patents. Also contemplated are graft copolymers, including those prepared by grafting onto the polyphenylene ether chain such vinyl monomers as acrylonitrile and vinylaromatic compounds (e.g., styrene), and such polymers as polystyrenes and elastomers. Other suitable polyphenylene ethers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocycles and formals.

The polyphenylene ether generally has a number average molecular weight, as determined by gel permeation chromatography, within the range of about 5,000–40,000; its intrinsic viscosity is most often in the range of about 0.35–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxyaromatic compound is 2,6-xylenol (wherein each $Q^1$ is methyl and each $Q^2$ is hydrogen), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consists of those containing copper. Such catalysts are disclosed, for example, in the aforementioned U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are cobalt-containing catalyst systems.

The following additional patents disclose manganese and cobalt-containing catalyst systems for polyphenylene ether preparation:

| | | |
|---|---|---|
| 3,956,242 | 4,083,828 | 4,184,034 |
| 3,962,181 | 4,093,596 | 4,315,086 |
| 3,965,069 | 4,093,597 | 4,335,233 |
| 3,972,851 | 4,093,598 | 4,385,168. |
| 4,058,504 | 4,102,865 | |
| 4,075,174 | 4,110,312 | |

Particularly useful polyphenylene ethers for the purposes of this invention are those which comprise molecules having at least one of the following end groups:

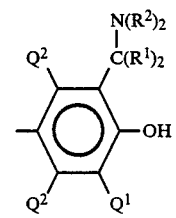

(II)

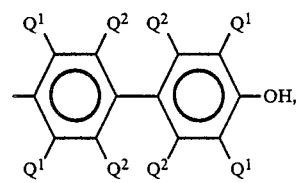

(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

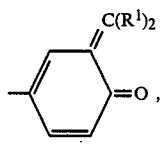
(IV)

with numerous beneficial effects often including an increase in impact strength and compatibilization with other blend components. Reference is made to the aforementioned U.S. Pat. Nos. 4,054,553, 4,092,294, 4,477,651 and 4,517,341.

Polymers with biphenol end groups of formula III are typically obtained from reaction mixtures in which a by-product diphenoquinone of the formula

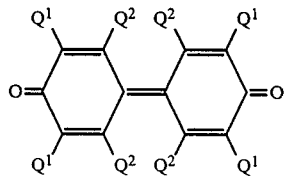
(V)

is present, especially in a copper-halide-secondary or tertiary amine system. In this regard, the disclosures of the aforementioned U.S. Pat. Nos. 4,234,706, 4,477,649 and 4,482,697 are particular pertinent. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

Aromatic polycarbonates are also useful as component A. In general, they contain repeating units having the formula

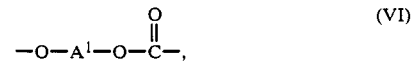
(VI)

wherein $A^1$ is an aromatic radical. Illustrative $A^1$ radicals include those derived from bisphenol A, 2,2',6,6'-tetramethylbisphenol A and 1,1-dichloro-2,2-bis(4-hydroxyphenyl)ethylene. Typical polycarbonates prepared from these and other aromatic dihydroxy compounds are well known in the art as illustrated by the following patents:

| | | | |
|---|---|---|---|
| 3,153,008 | 3,334,154 | 4,073,814 | 4,217,438 |
| 3,157,622 | 3,635,895 | 4,130,548 | 4,239,918 |
| 3,169,121 | 3,737,409 | 4,195,157 | 4,379,910. |
| 3,269,986 | | | |

The aromatic polyimides, another class of suitable aromatic polymers, are typically prepared by the reaction of a diamine (such as m-phenylenediamine, 4,4'-diaminodiphenylmethane or 4,4'-diaminodiphenyl ether) with a dianhydride. Typical dianhydrides are pyromellitic dianhydride, bis(3,4-dicarboxyphenyl)sulfone dianhydride, bis(3,4-dicarboxyphenyl) sulfide dianhydride and 2,2-bis[4-(3,4-dicarboxyphenoxy)phenyl]propane dianhydride. Because of the ether groups present in the last-mentioned bisphenol A dianhydride, polyimides derived therefrom are normally designated "polyetherimides". Polyimides and polyetherimides are also known in the art as illustrated by the following patents:

| | | | |
|---|---|---|---|
| 3,356,691 | 3,850,965 | 3,983,093 | 4,118,535 |
| 3,422,064 | 3,933,749 | 4,048,142 | 4,297,474 |
| 3,803,085 | 3,944,517 | 4,092,297 | 4,331,799 |
| 3,847,867 | 3,968,083 | 4,107,147 | 4,332,929. |
| 3,847,869 | 3,975,345 | | |

The aromatic polyesters useful as component A are those which are substantially free from ethylenic unsaturation. They are illustrated by poly(alkylene dicarboxylates), which normally comprise repeating units of the formula

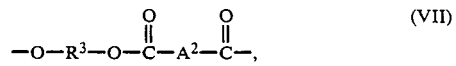
(VII)

wherein $R^3$ is a saturated divalent aliphatic or alicyclic hydrocarbon radical containing about 2–10 and usually about 2–6 carbon atoms and $A^2$ is a divalent aromatic radical containing about 6–20 carbon atoms. They are typically prepared by the reaction of at least one alkanediol such as ethylene glycol or 1,4-butanediol with at least one aromatic dicarboxylic acid such as isophthalic or terephthalic acid, or lower alkyl ester thereof. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

Also useful as component A are copolymers and other interpolymers including, in addition to the previously mentioned polyphenylene ether copolymers, polycarbonates prepared from bisphenol mixtures, polyester-polycarbonates and other graft and block polymers. Such copolymers and other interpolymers are disclosed in various patents listed hereinabove.

Mixtures of the above-described polymers are also useful. They include mixtures of condensation polymers, of addition polymers, and of condensation with addition polymers. Examples are polycarbonate-polyester mixtures and especially polyphenylene ether-vinyl aromatic polymer mixtures. The latter are preferred and are illustrated by the following patents:

| 3,383,435 | 3,787,532 |
|---|---|
| 3,639,508 | 3,943,191. |

To insure completeness of disclosure and to facilitate and understanding of the scope of the present invention, the relevant disclosures of all of the patents listed hereinabove are incorporated by reference herein.

The most preferred mixtures of polyphenylene ethers and vinyl aromatic polymers are those which contain about 35–90% and especially about 50–80% polyphenylene ether, by weight. The vinyl aromatic polymer is usually a styrene polymer and especially a homopolymer; such homopolymers are frequently designated "crystal polystyrene".

. The average molecular weights (number average whenever used herein) of the polymers useful as component A will vary widely, depending in large part on the type of polymer used. In general, molecular weights from about 5,000 to about 500,000 are most suitable. For polyphenylene ethers and polystyrenes, the preferred molecular weight ranges are about 5,000–40,000 and about 50,000–250,000, respectively.

COMPONENT B

Component B, the impact resistance-increasing ingredient in the compositions of this invention, is at least one elastomer containing highly polar ionic substituents; i.e., substituents with relatively high charge density. Said substituent and elastomer are hereinafter sometimes referred to as "ionomeric substituent" and "ionomeric elastomer", respectively.

The ionomeric substituents are acidic or strongly basic groups, most often acidic, or salts thereof. In general, these may be characterized as acidic or basic groups characterized by a $pK_a$ or $pK_b$ value up to about 6, or salts of such groups. Examples are sulfonic and carboxylic acid (both of which are preferred) and quaternary ammonium base groups and their salts which are stable at the processing temperatures of the compositions of this invention. Mixtures of any of the foregoing substituents are also suitable. Methods for their introduction into the elastomers, herein designated "ionomerization", are described hereinafter.

In general, it is preferred for at least part (typically at least about 35% and frequently all) of the ionomeric groups to be in the salt form. This may be achieved by known methods of treating the ionomeric elastomer, either in solution or in the melt, with suitable neutralizing agents. Alternatively, it may be achieved by melt blending a mixture containing a neutralizing agent, as described hereinafter. Examples of suitable acid salts are metal, ammonium, alkylammonium, phosphonium and alkylphosphonium. The metal salts, which are preferred, are illustrated by alkali metal, alkaline earth metal and zinc; sodium and zinc are especially preferred. Typical base salts are the chlorides, bromides, sulfates, sulfonates and phosphonates; the latter two may be either aliphatic or aromatic.

A characteristic property of the ionomeric elastomers is their "degree of ionomerization", which is defined as the mole percent of ionomeric groups based on mers in the polymer; in other words, as the number of ionomeric mers per 100 mers. The degree of ionomerization of component B which is preferred for the purposes of this invention is within the range of about 0.1–10%, especially about 0.25–5%.

The base elastomer for component B may be any elastomer known in the art. Examples thereof are provided in *Encyclopedia of Polymer Science and Technology*, Vol. 5, pp. 406–482 (1966), the disclosure of which is incorporated by reference herein.

A preferred subgenus of elastomers consists of those having a carbon atom backbone; that is, those in which the polymer chain consists entirely of carbon atoms. These are usually substantially free, and preferably entirely free, from aromatic moieties. They include natural rubber, synthetic diene rubbers such as polybutadiene and polyisoprene, butyl rubbers, polyisobutene rubbers, ethylene-propylene rubbers, ethylene-propylene-diene rubbers wherein the diene is non-conjugated (EPDM rubbers), chloroprene rubbers, and others known in the art. The molecular weights of said rubbers, before ionomerization, are typically about 10,000–250,000 and most often about 20,000–100,000.

The ionomerization of the above-described elastomers may be effected by known methods. For example, carboxylated rubbers are typically obtained by polymerization of a monomer mixture which includes an acid such as acrylic or methacrylic acid, or an ester thereof (e.g., ethyl acrylate, methyl methacrylate) in which the ester groups are subsequently hydrolyzed to free acid groups. A similar technique may be used for the preparation of sulfonated rubbers, using such monomers as 2-sulfoethyl methacrylate, sodium styrenesulfonate and 2-acrylamido-2-methylpropanesulfonic acid. Sulfonated carbon-backbone rubbers may also be prepared as disclosed in U.S. Pat. No. 3,642,728, the disclosure of which is incorporated by reference herein. Quaternary ammonium-ionomerized rubbers may be prepared by reacting a chlorinated derivative of a rubber, or a chloroprene rubber, with ammonia or an amine followed by quaternization.

A second subgenus of ionomeric elastomers consists of those having hetero backbones; i.e., containing more than one element in the polymer chain. These elements may include, for example, carbon, oxygen, nitrogen and silicon.

Illustrative polymers with hetero backbones include polyurethanes, polyethers and polysiloxanes, with the polysiloxanes being preferred. Typical ionomeric polysiloxane elastomers are represented by the formula

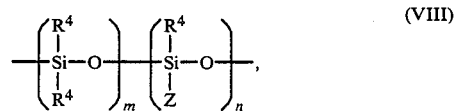
(VIII)

wherein each $R^4$ is independently a lower alkyl radical and preferably methyl, Z is an organic substituent containing an ionomeric moiety, and m and n are integers, with m being from about 10n to about 1000n and preferably from about 30n to about 400n. For the purpose of determining degree of ionomerizatin, each parenthesized structure in formula VIII is considered a mer. The molecular weights of such polysiloxanes are generally about 10,000–50,000.

The Z value in formula VIII is an organic radical which may contain ionomeric substituents such as any of those previously described. In a preferred embodiment, Z is a zwitterionic radical, usually a sulfoalkyl-substituted mono- or diaminoalkyl radical. The aminoalkyl radical is ordinarily lower aminoalkyl, and the sulfoalkyl substituents thereon normally contain about 2-carbon atoms.

The preparation of typical zwitterionic polysiloxyane elastomers is described by Graiver et al. in *Journal of Polymer Science: Polymer Chemistry Edition*, 17, 3559–3572 (1979), the disclosure of which is incorporated by reference herein, and may be effected by preparing a dimethylsiloxane-4,7-diazaheptylmethylsiloxane copolymer and reacting it with 1,3-propanesultone. In the resulting polysiloxane, Z may have the formula

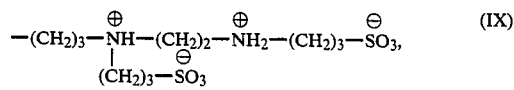

or, somewhat less preferably, one amino group may be unsubstituted. Similarly useful zwitterionic polysiloxane elastomers are disclosed in the following U.S. Pat. Nos.: 4,496,705, 4,523,002, 4,525,567.

The ionomeric polysiloxane elastomers, including the above-described zwitterionic elastomers, are normally derived from base polysiloxanes having molecular weights of about 5000–150,000 and preferably about 10,000–100,000. The preparation of such zwitterionic elastomers is illustrated by the following example.

EXAMPLE 1

A mixture of 700 grams (9.44 moles) of octamethylcyclotetrasiloxane, 29.2 grams (0.142 mole) of 4,7-diazoheptylmethyldimethoxysiloxane, 4.19 grams (0.0135 mole) of octamethyltrisiloxane and 0.544 gram (0.00972 mole) of potassium hydroxide was heated at 125°–180° C. with stirring for 20 hours. It was then cooled to 100° C., 2.5 grams of sodium bicarbonate was added and heating at that temperature was continued for 1 hour. The mixture was cooled, diluted with 1200 ml. of toluene and filtered using a filter aid material. The filtrate was washed twice with 300 ml. of distilled water concentrated to about 800 ml. and diluted with toluene at 1.5 liters. 1,3-Propanesultone, 31.72 grams (0.492 mole), was added and the mixture was stirred at room temperature overnight, after which water and volatiles were removed by vacuum evaporation. The product was the desired zwitterionic polysiloxane elastomer having a number average molecular weight of about 30,000 and a degree of ionomerization of about 0.72%. It may be represented by the formula

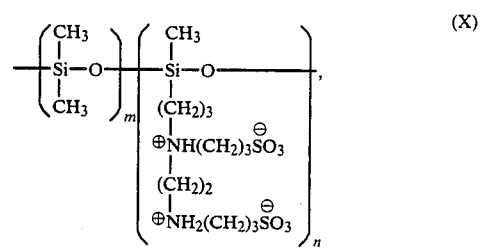

wherein m is about 266n.

Illustrative ionomeric polyurethane and polyether elastomers may be prepared by the incorporation of N-methyldiethanolamine units in the polymer and quaternization of said units with 1,3-propanesultone, as described by Hwang et al. in *Polymer Engineering and Science*, 21, 1027–1035 (1981), and by Yang et al. in *Makromol. Chem.*, 184, 651–668 (1983). Also useful are the ionomers prepared by reacting 1,4-butanesultone with free secondary amine groups in polyurethanes derived from polyalkylene polyamines, as described in German Pat. No. 922,736. The disclosures of the foregoing are incorporated by reference herein.

The polysiloxane, polyurethane and polyether elastomers may also contain other ionomeric groups. For example, quaternary ammonium base-ionomerized polysiloxanes may be prepared by quaternizing the previously described aminoalkyl-substituted polysiloxanes.

The glass transition temperature (Tg) of the ionomeric elastomer should be quite low. It is generally no higher than −20° C. and preferably below about −40° C.

It has previously been observed that elastomers having favorable tensile properties were effective for impact modification of various polymers. It has now been discovered, however, that the ionomeric polysiloxanes are useful as component B even through their tensile properties are not particularly favorable. In general, it appears that the impact properties of the compositions of this invention do not parallel the tensile properties of the ionomeric elastomer.

COMPONENT C

In the most cases, it has been found that mixtures of a major proportion of component A with a minor proportion of component B are subject to phase separation or delamination, sometimes referred to as "incompatibility". This problem is solved according to the present invention by incorporating a minor proportion of component C which is at least one substituted aromatic polymer, the substituents thereon being highly polar ionic substituents. Component C is typically prepared from an aromatic polymer of the type described hereinabove with reference to component A. Preferably, component C is an ionomeric derivative of component A, or, when component A is a mixture, of at least one constituent of said mixture. However, it is also within the scope of the invention to use as component C an ionomeric derivative of a polymer which is different from component A, provided said ionomeric derivative is effective in the manner described herein.

The highly polar ionic substituents on component C are, in general, the same ones described hereinabove with reference to component B. Thus, they are typically sulfonic acid, carboxylic acid or quaternary ammonium hydroxide groups or salts thereof. The presence of salts, at least in part, in component C is preferred and may be achieved by solution or melt neutralization of the ionomeric aromatic polymer or by melt blending a mixture containing a neutralizing agent, as described hereinafter.

It is especially preferred that the substituents on components B and C be the same, and most preferably that they all be sulfonate or carboxylate substituents. However, it is also contemplated, for example, for component B to contain carboxylate substituents and component C sulfonate substituents or vice versa. It is also contemplated for one component to have anionic and the other cationic substituents, whereupon they neutralize each other and no further salt formation is necessary.

Ionomerization of the aromatic polymer to produce component C may be accomplished by methods known in the art. For example, the carboxylic and sulfonic acid or ester monomers disclosed hereinabove with reference to component B may be incorporated in a monomer mixture containing styrene or the like to form an ionomeric addition polymer. Condensation polymers may be prepared from a mixture including an endcapping agent having the desired functionality; for example, a sulfonate-terminated polyimide may be prepared by reacting a dianhydride with a mixture of a diamine and an aminosulfonic acid as disclosed in copending, commonly owned application Ser. No. 647,546, filed Sept, 6, 1984, now abandoned. Sulfonate groups may also be incorporated in aromatic polymers by reaction with sulfonating agents such as sulfur trioxide or acetyl sulfate or sulfur trioxide, preferably complexed with a deactivating agent such as triethyl phosphate as disclosed and claimed in copending, commonly owned applications Ser. No. 682,202, filed Dec. 17, 1984, now U.S. Pat. No. 4,574,144, and Ser. No. 768,256, filed Aug. 22, 1985, now abandoned. Other sulfonation methods are disclosed in U.S. Pat. No. 3,870,841, the disclosure of which is incorporated by reference herein. Quaternary ammonium groups may be introduced by nitration followed by reduction and quaternization.

The preferred molecular weight ranges for the aromatic polymers which are ionomerized to produce component C are generally the same as those for component A. The degree of ionomerization of component C is typically about 0.5–10% and most often about 1–5%. For ionomerized polyphenylene ethers, a degree of ionomerization of about 1–3% is frequently preferred since impact strengths are often maximized at that level.

While the present invention is not dependent on theory, it is believed that the improved properties afforded thereby are a result of polar interactions between the ionomeric groups in components B and C. These interactions, coupled with the compatibility of components A and C as result of their structural similarity by reason of the aromatic content thereof, constitute a novel mechanism of bonding which permits the incorporation of component B, the impact modifier, as a substantially stable disperse phase in component A. Such incorporation in turn minimizes delamination and similar types of physical failure.

The preparation of ionomeric polymers useful as component C in the compositions of this invention is illustrated by the following examples.

EXAMPLE 2

A solution of 76 ml. of acetic anhydride in 400 ml. of 1,2-dichloroethane was cooled to 10° C. and 48.9 grams of 95% sulfuric acid was added dropwise over 20 minutes. A 300-ml. portion of the resulting sulfonating agent was added dropwise at 50° C., over 10 minutes, to a stirred solution in three liters of 1,2-dichloroethane of 625 grams of a poly(2,6-dimethyl-1,4-phenylene ether) having a molecular weight of about 20,000 and an intrinsic viscosity in chloroform at 25° C. of 0.48 dl./g. The mixture was stirred for 60 minutes, after which 200 ml. of methanol and a solution of 65 grams of zinc acetate in 200 ml. of water were added. The mixture was poured into an excess of methanol and the precipitated ionomer was removed by filtration and dried in a vacuum oven. There was obtained about 600 grams of the desired zinc salt of the sulfonated polyphenylene ether; it contained 1.4% sulfur and had a degree of ionomerization of about 5.3%

EXAMPLE 3

The procedure of Example 2 was repeated, except that the 1,2-dichloroethane and polyphenylene ether were respectively replaced, on an equal weight basis, by methylene chloride and a styrene homopolymer having a molecular weight of about 106,000 and an intrinsic viscosity in toluene at 25° C. of 0.80 dl./g., and the sulfonation was effected at reflux temperature. There was obtained about 600 grams of the desired zinc salt of the sulfonated polystyrene; it contained 1.3% sulfur and had a degree of ionomerization of about 4.2%.

COMPONENT D

In a preferred embodiment of the invention, the compositions additionally comprise (D) at least one plasticizer, which facilitates molding and other working operations by lowering the melt viscosity of the composition.

A wide variety of plasticizers are suitable for use as component D. In general, they are polar materials melting at least 50° below the processing temperature of the resinous components of the composition; for systems containing a substantial amount of polyphenylene ether, the plasticizers should melt no higher than about 190° C. It is also preferred that their volatility be sufficiently low to permit their retention to the composition during processing.

Typical plasticizers include compounds containing at least one of oxygen, phosphorus and nitrogen atoms, and compounds releasing a small polar molecule such as water or methanol at elevated temperatures. In addition to serving as plasticizers, compounds containing phosphorus may act as flame retardant additives.

Examples of oxygen-containing materials are organic acids and their salts and esters such as stearic acid, lauric acid, calcium stearate, zinc laurate, zinc stearate, magnesium laurate, aluminum ricinoleate, dimethyl sebacate and dimethyl phthalate; and alcohols, phenols and ethers such as hexyl.alcohol, nonylphenol, resorcinol, benzyl alcohol and ethyl hexyl ether.

Illustrative phosphorus-containing compounds are triphenyl phosphate, tri-p-tolyl phosphate, tris(3,5-dimethylphenyl) phosphate, tributyl phosphate, triisopropyl phosphate and tetraalkylphosphonium p-toluenesulfonate. Nitrogen-containing materials include stearamide, p-toluenesulfonamide, diphehylurea, diphenylguanidine, di-o-tolylguanidine, piperazine, aniline, dihexylamine, diphenylamine, phenyl-$\beta$-naphthylamine and tetraalkylammonium p-toluenesulfonate.

Polar molecule-releasing materials include various hydrates of simple and mixed oxides and salts such as lithium sulfate dihydrate, ammonium cerium sulfate octahydrate, ammonium chromium(III) sulfate dodecahydrate, ferric ammonium sulfate dodecahydrate, barium oxide octahydrate, bismuth dioxide dihydrate and the like, and alcoholates such as calcium chloride tetramethanolate.

The preferred plasticizers, especially when component A is entirely or partially polyphenylene ether, are triaryl phosphates and the fatty acids and/or metal (especially zinc) salts thereof. In most instances a combination of the two is used, typically containing about 40–70% by weight triaryl phosphate with the balance being fatty acid and/or metal salt.

COMPONENT PROPORTIONS

The amount of component B in the compositions of this invention may be any amount effective to provide the desired degree of impact resistance. The amount of component C is an amount effective to maintain component B as a substantially stable disperse phase in component A. While it is within the scope of the invention for component B to be soluble in the resin system, solubility is not necessary and is frequently unattainable.

In general, the compositions of the invention comprise about 50–85% by weight of component A, about 2–20% of component B and about 2–40% of component C, based on total weight of the resinous components (i.e., of the combination of components A, B and C). It is generally found that compositions in which component B is a polysiloxane ionomer require less of component B and often more of component C then those in which component B has a carbon backbone. Most often, the compositions in which component B has a carbon backbone may advantageously contain about 70–85% of component A, about 5–15% of component B and about 2–20% of component C. On the other hand, when component B is polysiloxane-based the preferred proportions are about 50–80% of component A, about 3–10% of component B and about 15–40% of component C.

Component D, when present, is generally in the amount of about 5–35 phr. (parts by weight per 100 parts of resinous components). In general, less plasticizer is required when component A consists entirely of condensation polymer than when it is a blend of condensation and addition polymers. In the former case the preferred plasticizer range is about 5–15 phr., and the in the latter case about 15–35 and especially about 20–35 phr.

While the presence of a plasticizer in the compositions of this invention may be desirable for the aforementioned purposes, the level thereof should generally be no higher than necessary since tensile strength tends to decrease with increasing plasticizer level. One advantage of using a zinc salt as component C, rather than a salt containing another cation such as sodium, is that it frequently enables one to use a lower level of plasticizer, thus increasing tensile strength.

DETAILES OF PREPARATION; SPECIFIC EMBODIMENTS

The compositions of this invention may be prepared by merely blending the ingredients thereof under conditions adapted for the formation of an intimate blend. Such conditions often include extrusion, typically at temperatures in the range of about 100°–300° C. Extrusion is typically effected in a screw-type or similar extruder which applies a substantial shearing force to the composition, thereby decreasing the particle size thereof.

It is also contemplated to prepare salt-containing compositions of this invention by melt blending a mixture comprising components A, B and C and preferably also component D, at least one of components B and C being wholly or partly in the free acid or base form, and a neutralizing agent therefor at a temperature in the range of about 150°–300° C. This method of preparation is another embodiment of the invention.

The neutralizing agents useful in this embodiment include single compounds and mixtures selected from metal oxides, metal hydroxides and metal salts of fatty acids. They also include metal salts of polyketones containing at least two carbonyl groups separated by a single CH moiety (e.g., 2,4-pentanedione), as disclosed in copending commonly owned application Ser. No. 759,198, filed July 26, 1985, the disclosure of which is incorporated by reference herein. The preferred metal is zinc, and zinc oxide and zinc stearate are preferred neutralizing agents. Metal salts of fatty acids used for this purpose also serve as plasticizers, as disclosed hereinabove.

The melt blending embodiment is particularly useful when the ionomeric components contain carboxylic acid groups and both are wholly in the acid form. It may be conducted conventionally in an extruder or the like. The proportion of neutralizing agent employed is not critical and will depend on the degree of neutralization desired. It is usually at least stoichiometric and frequency an excess, typically about 1.1–10.0 equivalents thereof per equivalent of ionomeric components.

One of the advantageous features of the present invention is a result of the effectiveness of component C to promote uniform particle size of component B and adhesion of the particles thereof to the continuous or external phase which comprises chiefly component A. An examination of the fracture surfaces of Izod impact bars with a scanning electron microscope shows that the elastomer particles therein are quite uniform in particle size, a major proportion of the particles thereof being in the 0.1–3.5 micron and most often in the 0.2–1.5 micron range. These particles are uniformly dispersed in the polymer matrix and adhere well thereto, minimizing delamination. By contrast, blends from which component C is absent contain less uniform, poorly adhered elastomer particles.

In addition to the ingredients described in detail herein, the compositions of this invention can also contain other materials such as fillers, pigments, ultraviolet stabilizers, anti-static agents, mold release agents and auxiliary impact modifiers. Materials useful for these purposes, and the proportions useful in the compositions of this invention, will be apparent to those skilled in the art.

The preparation of the compositions of this invention is illustrated by the following examples. All parts and percentages except degree of ionomerization are by weight.

EXAMPLES 4–6

In component A, the polyphenylene ether was a poly-(2,6-dimethyl-1,4-phenylene ether) having a molecular weight of about 20,000 and an intrinsic viscosity in chloroform at 25° C. of 0.48 dl./g. The polystyrene was "Monsanto Lustrex HH-101", a commercially available styrene homopolymer having a molecular weight of about 106,000 and an intrinsic viscosity in toluene at 25° C. of 0.80 dl./g.

Component B was "Uniroyal IE-2590", a commercially available zinc sulfonate derived from a sulfonated EPDM rubber having a molecular weight of about 50,000 and containing an average of 13 sulfonate groups per molecule, for a degree of ionomerization of about 0.86%. It has a Tg of about −60° C. The sulfonated polyphenylene ether comprising component C was prepared according to the method of Example 2, varying the amount of sulfonating agent to afford the appropriate degree of ionomerization and neutralizing with zinc acetate.

The compositions were prepared by blending the appropriate proportions of ingredients, mixing in a jar mill for 2 hours and extruding on a twin screw extruder at about 160°–270° C. The extruded material was quenched in water, pelletized and dried at 80° C. Test specimens were then prepared by injection molding and tested for Izod impact (ASTM procedure D256), compared with a control in which component C was absent. The fracture surfaces of the specimens after the Izod test were visually inspected for delamination; no substantial delamination was observed for Examples 4–6.

The compositional and test data for Examples 4–6 are listed in Table I.

preferred range is also evident from a comparison of Example 5 with Examples 4 and 6.

EXAMPLES 7–15

The constituents of component A were the same as in Examples 4–6. Component B was "Uniroyal IE-1025", a commercially available zinc sulfonate similar to "Uniroyal IE-2590" except that it contains an average of 5 sulfonate groups per molecule and has a degree of ionomerization of about 0.33%. The sulfonated polystyrene comprising component C was prepared according to the method of Example 3, varying the amount of sulfonating agent to afford the appropriate degree of ionomerization and neutralizing with zinc acetate or sodium hydroxide as appropriate.

The compositions were prepared as in Examples 4–6 and tested (in comparison with a control in which component C was absent) for Izod impact strength and, in some instances, for tensile strength (ASTM procedure D638, Type V specimen). No substantial delamination was observed for Examples 7–15.

The compositional and test data for Examples 7–15 are listed in Table II.

TABLE II

| Ingredient | 7 | 8 | 9 | 10 | 11 | 12 | 13 | 14 | 15 | Control |
|---|---|---|---|---|---|---|---|---|---|---|
| Component A, % of total resins | 76.6 | 70.1 | 76.6 | 80.5 | 84.4 | 80.5 | 84.4 | 68.2 | 78.4 | 88.2 |
| Polyphenylene ether: | | | | | | | | | | |
| % of total resins | 64.9 | 51.9 | 64.9 | 64.9 | 64.9 | 64.9 | 64.9 | 47.0 | 60.3 | 53.3 |
| % of component A | 84.7 | 74.1 | 84.7 | 80.6 | 76.9 | 80.6 | 76.9 | 68.9 | 76.9 | 60.2 |
| Polystyrene, % of total resins | 11.7 | 18.2 | 11.7 | 15.6 | 19.5 | 15.6 | 19.5 | 21.2 | 18.1 | 35.1 |
| Component B, % of total resins | 11.7 | 11.7 | 11.7 | 11.7 | 11.7 | 7.8 | 3.9 | 10.6 | 10.8 | 11.7 |
| Component C | | | | | | | | | | |
| Zinc salt, % of total resins | — | — | 11.7 | 7.8 | 3.9 | 11.7 | 11.7 | — | 10.8 | — |
| Sodium salt, % of total resins | 11.7 | 18.2 | — | — | — | — | — | 21.2 | — | — |
| Degree of ionomerization, % | 4.2 | 4.2 | 4.2 | 4.2 | 4.2 | 4.2 | 4.2 | 4.2 | 4.2 | — |
| Component D, phr. | 29.9 | 29.9 | 29.9 | 29.9 | 29.9 | 29.9 | 29.9 | 17.7 | 20.4 | 29.9 |
| Triphenyl phosphate | 18.2 | 18.2 | 18.2 | 18.2 | 18.2 | 18.2 | 18.2 | 10.6 | 9.6 | 18.2 |
| Zinc stearate | 11.7 | 11.7 | 11.7 | 11.7 | 11.7 | 11.7 | 11.7 | 7.1 | 10.8 | 11.7 |
| Tensile strength, psi. | — | — | 5400 | — | — | — | — | — | 6800 | — |
| Impact strength: | | | | | | | | | | |
| Joules/m. | 566.0 | 550.0 | 672.8 | 640.8 | 614.1 | 534.0 | 74.8 | 44.9 | 587.4 | 32.0 |
| Ft.-lb./in. | 10.6 | 10.3 | 12.6 | 12.0 | 11.5 | 10.0 | 1.4 | 0.84 | 11.0 | 0.6 |

TABLE I

| Ingredient | 4 | 5 | 6 | Control |
|---|---|---|---|---|
| Component A, % of total resins | 75.3 | 75.3 | 70.1 | 91.7 |
| Polyphenylene ether: | | | | |
| % of total resins | 52.0 | 52.0 | 51.9 | 55.0 |
| % of component A | 68.9 | 68.9 | 74.1 | 60.0 |
| Polystyrene, % of total resins | 23.3 | 23.3 | 18.2 | 36.7 |
| Component B, % of total resins | 11.7 | 11.7 | 11.7 | 8.3 |
| Component C | | | | |
| % of total resins | 13.0 | 13.0 | 18.2 | — |
| Degree of ionomerization, % | 0.8 | 1.3 | 4.2 | — |
| Component D, phr. | 29.9 | 29.9 | 29.9 | 21.1 |
| Triphenyl phosphate | 18.2 | 18.2 | 18.2 | 12.8 |
| Zinc stearate | 11.7 | 11.7 | 11.7 | 8.3 |
| Impact strength: | | | | |
| Joules/m. | 77.4 | 534.0 | 106.8 | 10.7 |
| Ft.-lb./in. | 1.45 | 10.0 | 2.0 | 0.2 |

It is apparent from Table I that the compositions of this invention are superior in impact strength to compositions containing only components A and B. The superior impact strength of compositions in which component C has a degree of ionomerization within the 1–3%

The results in Table II, like those in Table I, show the favorable impact strengths generally possessed by the compositions of this invention when compared to compositions not containing component C. They also indicate some trends resulting from changes in various parameters. Examples 9, 12 and 13, for instance, demonstrate the results of varying the level of component B in the compositions, and especially of decreasing said level below about 5%. Examples 7 and 9 show the superiority of zinc salts to sodium salts as component C with respect to impact strength, and Examples 9–11 show the relatively small effect of the level of zinc salt on impact strength. A comparison of Examples 8 and 14 on the one hand and Examples 9 and 15 on the other shows the superiority of zinc salts to sodium salts as component C with respect to plasticizer level and the effect thereof on impact strength. Finally, the effect of lower plasticizer levels, where possible, on tensile strength is apparent from a comparison of Examples 9 and 15.

EXAMPLES 16–18

These examples are similar to Examples 4–6 except that component B was the ionomeric polysiloxane elastomer of Example 1. The method of making the compositions was the same as that used in Examples 4–6 except that the blend was homogenized in a Henschel mixer prior to extruding. The compositional and test data are given in Table III (in comparison with two controls as indicated). As with Examples 4–6, the compositions of Examples 16–18 showed substantially no delamination.

TABLE III

| Ingredient | Example | | | Controls | |
|---|---|---|---|---|---|
|  | 16 | 17 | 18 | A | B |
| Component A, % of total resins | 79.0 | 64.9 | 58.4 | 83.3 | 67.5 |
| Polyphenylene ether: | | | | | |
| % of total resins | 79.0 | 51.9 | 45.4 | 83.3 | 54.5 |
| % of Component A | 100 | 80.0 | 66.4 | 100 | 80.7 |
| Polystyrene, % of total resins | — | 13.0 | 13.0 | — | 13.0 |
| Component B, % of total resins | 4.3 | 9.1 | 9.1 | — | — |
| Component C | | | | | |
| % of total resins | 16.7 | 26.0 | 32.5 | 16.7 | 32.5 |
| Degree of ionomerization, % | 1.3 | 2.8 | 1.3 | 1.3 | 3.7 |
| Component D, phr. | 8.2 | 29.9 | 29.9 | 11.1 | 29.9 |
| Triphenyl phosphate | 4.1 | 18.2 | 18.2 | 4.4 | 18.2 |
| Zinc stearate | 4.1 | 11.7 | 11.7 | 6.7 | 11.7 |
| Impact strength: | | | | | |
| Joules/m. | 96.1 | 453.9 | 138.8 | 53.4 | 42.7 |
| Ft.-lb./in. | 1.8 | 8.5 | 2.6 | 1.0 | 0.8 |

In addition to the demonstration in Table III of the utility of compositions in which component B is a polysiloxane elastomer, Examples 17 and 18 illustrate the favorable effect on impact strength of the use of a combination of polyphenylene ether and polystyrene as component A, especially when said combination contains at least about 50% polyphenylene ether.

EXAMPLES 19–22

In component A, the polyphenylene ether and polystyrene were those of Examples 4–6. Component B was obtained by preparing a methylene chloride solution of "Polysar Krynac 221", a commercially available elastomeric terpolymer of 66.7 mole percent butadiene, 28.8 mole percent acrylonitrile and 4.5 mole percent acrylic acid having a degree of ionomerization of 4.5%; reacting the solution with 40 mole percent of a solution of sodium hydroxide in aqueous isopropanol; and vacuum stripping the solvents. The resins used as component C were the zinc salt of a sulfonated polystyrene similar to that of Example 3 and a styrene-sodium acrylate copolymer containing 7.1 mole percent sodium acrylate units (and thus having a degree of ionomerization of 7.1%) and prepared by neutralization of a commercially available styrene-acrylic acid copolymer.

The compositions were prepared by blending the appropriate proportions of ingredients, mixing in a jar mill for one hour and extruding on a twin screw extruder at about 160°–280° C. The extruded material was quenched in water, pelletized and dried at 80° C. Test specimens were then prepared as in Examples 4–6 and tested (in comparison with controls) for Izod impact strength. The compositional and test data are given in Table IV. The compositions of Examples 19–22 showed no delamination, while severe delamination was observed in the controls.

TABLE IV

| Ingredient | Example | | | | Controls | |
|---|---|---|---|---|---|---|
|  | 19 | 20 | 21 | 22 | A | B |
| Component A, % of total resins | 76.6 | 85.6 | 81.6 | 78.4 | 100 | 88.3 |
| Polyphenylene ether: | | | | | | |
| % of total resins | 64.9 | 60.3 | 61.4 | 60.3 | 64.9 | 64.9 |
| % of component A | 84.7 | 70.4 | 75.2 | 76.9 | 64.9 | 73.5 |
| Polystyrene, % of total resins | 11.7 | 25.3 | 20.2 | 18.1 | 35.1 | 23.4 |
| Component B, % of total resins | 11.7 | 7.2 | 7.4 | 10.8 | — | 11.7 |
| Component C | | | | | | |
| Sulfonate, % of total resins | 11.7 | — | 13 | — | — | — |
| Carboxylate, % of total resins | — | 7.2 | 11.0 | 10.8 | — | — |
| Component D, phr. | 29.9 | 20.5 | 22.7 | 20.5 | 29.9 | 29.9 |
| Triphenyl phosphate | 18.2 | 16.9 | 17.2 | 16.9 | 18.2 | 18.2 |
| Zinc stearate | 11.7 | 3.6 | 5.5 | 3.6 | 11.7 | 11.7 |
| Impact strength: | | | | | | |
| Joules/m. | 614.1 | 267.0 | 144.2 | 475.3 | 42.8 | 138.8* |
| Ft.-lb./in. | 11.5 | 5.0 | 2.7 | 8.9 | 0.8 | 2.6* |

*Average of 2 determinations.

In general, Table IV shows the same trends as Tables I–III. The apparent similarity in properties of the composition of Example 21 to Control B is reflected only in impact strength since, as previously noted, the latter was substantially inferior to the former with respect to delamination.

EXAMPLE 23

Following the procedure of Examples 4–6, a polymer blend was prepared comprising the following:

Component A: 51.8 parts of a 2,2'6,6'-tetramethylbisphenol A polycarbonate having a molecular weight of 15,500 and an intrinsic viscosity in chloroform at 25° C. of 0.53 dl./g., and 27.0 parts of "Monsanto Lustrex HH-101".

Component B: 10.6 parts of the zinc salt of a sulfonated EPDM rubber having a degree of ionomerization of about 0.15% and prepared from "Vistalon 3708", a commercially available EPDM rubber available from Exxon Corporation which has a molecular weight of about 50,000.

Component C: 10.6 parts of the sulfonated styrene homopolymer of Example 3.

Component D: 7.1 phr. of triphenyl phosphate; 10.6 phr. of zinc stearate.

EXAMPLE 24

Following the procedure of Examples 4–6, a polymer blend is prepared comprising the following:

Component A: 82 parts of a polyetherimide having a molecular weight of about 20,000 and an intrinsic viscosity in chloroform at 25° C. of 0.47 dl/g., prepared by the reaction of approximately equimolar quantities of 2,2-bis[4-(3,-4-dicarboxyphenoxy)phenyl]propane dianhydride and m-phenylene diamine.

Component B: 9 parts of the ionomeric elastomer of Example 19.

Component C: 9 parts of the zinc salt of a sulfonated polyetherimide prepared by the reaction of a polyetherimide of component A with a sulfur trioxide-diethyl phosphate complex at about 25° C.

EXAMPLES 25-26

In component A, the polyphenylene ether and polystyrene were those of Examples 4-6 and component B was "Uniroyal IE-2590". The resins used as component C were the styrene-sodium acrylate copolymer of Examples 19-22 and its acidic (i.e., non-neutralized) counterpart.

The compositions were prepared as in Examples 19-22 and test specimens evaluated for delamination, in comparison with controls. The compositional and test data are given in Table V.

TABLE V

| Ingredient | Example 25 | 26 | Control |
|---|---|---|---|
| Component A, % of total resins | 76.6 | 76.6 | 88.3 |
| Polyphenylene ether: | | | |
| % of total resins | 64.9 | 64.9 | 64.9 |
| % of Component A | 84.7 | 84.7 | 73.5 |
| Polystyrene, % of total resins | 11.7 | 11.7 | 23.4 |
| Component B, % of total resins | 11.7 | 11.7 | 11.7 |
| Component C, % of total resins | | | |
| Styrene-sodium acrylate copolymer | 11.7 | — | — |
| Styrene-acrylic acid copolymer | — | 11.7 | — |
| Component D, phr. | 29.9 | 29.9 | 29.9 |
| Triphenyl phosphate | 18.2 | 18.2 | 18.2 |
| Zinc stearate | 11.7 | 11.7 | 11.7 |
| Delamination | None | None | Some |

EXAMPLES 27-29

In component A, the polyphenylene ether and polystyrene were those of Examples 4-6. Components B and C were the free acid polymers corresponding to the neutralized polymers of Example 20. Zinc stearate or zinc oxide were added as neutralizing agents. The compositions were melt blended and test specimens prepared using the method of Examples 19-22. The relevant parameters and test results are given in Table VI.

TABLE VI

| Ingredient | 27 | 28 | 29 | Control |
|---|---|---|---|---|
| Component A, % of total resins | 77.8 | 78.6 | 78.0 | 77.8 |
| Polyphenylene ether: | | | | |
| % of total resins | 61.7 | 59.5 | 61.0 | 61.7 |
| % of component A | 79.3 | 75.7 | 78.2 | 79.3 |
| Polystyrene, % of total resins | 16.1 | 19.1 | 17.0 | 16.1 |
| Component B, % of total resins | 11.1 | 10.7 | 11.0 | 11.1 |
| Component C, % of total resins | 11.1 | 10.7 | 11.0 | 11.1 |
| Component D, phr. | 16.1 | 15.5 | 18.3 | 23.5 |
| Triphenyl phosphate | 16.1 | 15.5 | 15.9 | 16.1 |
| Stearic acid | — | — | 2.4 | 7.4 |
| Neutralizing agent, phr. | 7.4 | 3.6 | 3.7 | — |
| Zinc stearate | 7.4 | — | 3.7 | — |
| Zinc oxide | — | 3.6 | — | — |
| Impact strength: | | | | |
| Joules/m. | 539.3 | 325.7 | 251.0 | 144.2 |
| Ft.-lb./in. | 10.1 | 6.1 | 4.7 | 2.7 |
| Delamination | Sl. skin | None | None | Sl. skin |

EXAMPLE 30

A composition was prepared by melt blending according to Examples 27-29, in which component B was the carboxylic acid copolymer of Examples 27-29, component C was the neutralized polystyrene of Example 3, and there was also present as an auxiliary impact modifier a commercially available A-B-A block copolymer in which the A blocks were polystyrene and the B block was ethylene-butylene. The neutralizing agent for component B was zinc stearate. The ingredients were present in the following proportions:

| | |
|---|---|
| Component A, % of total resins | 76.0 |
| Polyphenylene ether: | |
| % of total resins | 60.8 |
| % of component A | |
| Polystyrene, % of total resins | 15.2 |
| Component B, % of total resins | 6.3 |
| Component C, % of total resins | 11.4 |
| Component D (triphenyl phosphate), phr. | 16.5 |
| Neutralizing agent, phr. | 11.4 |
| Aux. impact modifier, % of total resins | 6.3 |

It was found to have an Izod impact strength of 480.6 joules/m. (9.0 ft.-lb./in.) and showed no delamination.

What is claimed is:

1. A polymer composition comprising:
   (A) a major proportion of at least one polyphenylene ether, or a mixture thereof with a styrene homopolymer;
   (B) a minor proportion, effective to increase impact resistance, of at least one elastomer substantially free from aromatic moieties, having a carbon atom polymer chain and containing sulfonic or carboxylic acid substituents or salts thereof;
   (C) a minor proportion, effective to maintain component B as a substantially stable disperse phase in component A, of at least one substituted aromatic polymer, the substituents thereof being sulfonic or carboxylic acid groups or salts thereof as defined for component B; and
   (D) at least one plasticizer, said plasticizer being a polar material melting at least 50° C. below the processing temperature of the resinous components of the composition.

2. A composition according to claim 1 wherein the polyphenylene ether is a poly(2,6-dimethyl-1,4-phenylene ether).

3. A composition according to claim 2 wherein component A consists of said polyphenylene ether.

4. A composition according to claim 2 wherein component A is a mixture of said polyphenylene ether with a styrene homopolymer having a number average molecular weight of about 50,000-250,000, said mixture containing about 35-90% by weight polyphenylene ether.

5. A composition according to claim 4 wherein component B has a degree of ionomerization of about 0.1-10%, a molecular weight of about 10,000-250,000 and a glass transition temperature no higher than about −20° C.

6. A composition according to claim 5 wherein component B is entirely free from aromatic moieties and has a degree of ionomerization of about 0.25-5%.

7. A composition according to claim 6 wherein component B is a zinc or sodium salt of a sulfonated EPDM rubber.

8. A composition according to claim 7 wherein component B is a zinc salt.

9. A composition according to claim 4 wherein component C is an ionomeric derivative of at least one constituent of component A and has a degree of ionomerization of about 0.5-10%.

10. A composition according to claim 9 wherein component C is a zinc or sodium salt of a sulfonated styrene homopolymer.

11. A composition according to claim 10 wherein component C is a zinc salt.

12. A composition according to claim 4 which comprises about 50-85% by weight of component A, about 2-20% of component B, about 2-40% of component C and 5-35 parts by weight, per 100 parts of resinous components, of component D.

13. A composition according to claim 4 wherein component D contains at least one of oxygen, phosphorus and nitrogen atoms or releases a small polar molecule at elevated temperatures.

14. A composition according to claim 13 wherein component D is a combination of about 40-70% by weight triaryl phosphate with the balance being zinc stearate.

15. A method for preparing a composition according to claim 4 which comprises melt blending a mixture comprising components A, B, C and D, at least one of components B and C being wholly or partly in the free acid form, and a neutralizing agent therefor at a temperature in the range of about 150°-300° C.

16. A method according to claim 15 wherein components B and C are both wholly in the free acid form and the neutralizing agent is at least one compound selected from metal oxides, metal hydroxides, metal salts of fatty acids and metal salts of polyketones containing at least two carbonyl groups separated by a single CH moiety.

17. A method according to claim 16 wherein the polyphenylene ether is a poly(2,6-dimethyl-1,4-phenylene ether); component B is entirely free from aromatic moieties and has a degree of ionomerization of about 0.25-5%, a molecular weight of about 10,000-250,000 and a glass transition temperature no higher than about $-20°$ C.; and the substituents on components B and C are carboxyl groups.

18. A method according to claim 17 wherein component C is a styrene-acrylic acid copolymer having a degree of ionomerization of about 1-5%.

19. A method according to claim 17 wherein component D is at least one triaryl phosphate.

20. A method according to claim 19 wherein the neutralizing agent is zinc oxide or zinc stearate.

* * * * *